(12) United States Patent
Sharma et al.

(10) Patent No.: US 8,449,821 B2
(45) Date of Patent: May 28, 2013

(54) SLUG MITIGATION BY INCREASING AVAILABLE SURGE CAPACITY

(75) Inventors: Sanjay Kumar Sharma, Houston, TX (US); Ravi Nath, Houston, TX (US)

(73) Assignee: Honeywell International Inc., Morristown, NJ (US)

( * ) Notice: Subject to any disclaimer, the term of this patent is extended or adjusted under 35 U.S.C. 154(b) by 342 days.

(21) Appl. No.: 12/787,323

(22) Filed: May 25, 2010

(65) Prior Publication Data

US 2011/0290108 A1 Dec. 1, 2011

(51) Int. Cl.
| | |
|---|---|
| G01N 21/00 | (2006.01) |
| G01N 31/00 | (2006.01) |
| G01N 33/00 | (2006.01) |
| B01D 19/00 | (2006.01) |
| B01D 12/00 | (2006.01) |
| B01D 17/00 | (2006.01) |
| B01D 43/00 | (2006.01) |

(52) U.S. Cl.
USPC ............... 422/62; 95/262; 96/156; 96/182; 96/220; 210/513; 210/521

(58) Field of Classification Search
USPC ....... 95/262; 96/220; 700/273, 281; 210/513, 210/521
See application file for complete search history.

(56) References Cited

U.S. PATENT DOCUMENTS

| | | | |
|---|---|---|---|
| 4,265,263 A | 5/1981 | Hobbs | |
| 4,386,623 A | 6/1983 | Funk et al. | |
| 4,466,054 A | 8/1984 | Shigemasa et al. | |
| 4,604,681 A | 8/1986 | Sakashita | |
| 4,956,763 A | 9/1990 | Stewart, Jr. et al. | |
| 5,335,185 A | 8/1994 | Pitts et al. | |
| 5,396,923 A | 3/1995 | Allen et al. | |
| 5,706,193 A | 1/1998 | Linzenkirchner | |
| 5,928,519 A * | 7/1999 | Homan | 210/741 |
| 6,622,056 B1 | 9/2003 | Lindell | |
| 6,773,605 B2 * | 8/2004 | Nyborg et al. | 210/741 |
| 6,881,329 B2 * | 4/2005 | Amado et al. | 210/96.1 |
| 6,936,665 B2 | 8/2005 | Stephens et al. | |
| 7,284,563 B2 | 10/2007 | Partridge et al. | |
| 7,546,170 B2 | 6/2009 | Ayala et al. | |
| 7,684,899 B2 | 3/2010 | Nath et al. | |

(Continued)

OTHER PUBLICATIONS

Driedger, W. "Controlling Tanks and Vessels", pp. 1-20, Sep. 7, 2011 <http://www.driedger.ca/ce6_v&t/Ce6_v&t.pdf>.*

(Continued)

*Primary Examiner* — Jill Warden
*Assistant Examiner* — Charles D. Hammond

(57) ABSTRACT

A system includes a controller and an apparatus that includes a housing having a volume and an inlet. The inlet can receive a fluid that includes a gas and a liquid. The apparatus also includes a baffle that partitions the volume into a first portion and a second portion. The baffle extends from a base of the housing. The first portion can receive the liquid and separate the liquid into a first part and a second part. The second portion can receive the second part of the liquid from the first portion. The controller regulates an amount of the second part of the liquid in the second portion such that a level of the second part of the liquid is higher than a height that the baffle extends from the base of the housing, thus enabling the use of the extra surge capacity in the vessel.

20 Claims, 4 Drawing Sheets

U.S. PATENT DOCUMENTS

| | | | |
|---|---|---|---|
| 2001/0049460 A1 | 12/2001 | Herzog | |
| 2004/0011748 A1* | 1/2004 | Amado et al. | 210/800 |
| 2008/0103747 A1 | 5/2008 | Macharia et al. | |
| 2008/0103748 A1 | 5/2008 | Axelrud et al. | |
| 2009/0024253 A1* | 1/2009 | Nath et al. | 700/281 |

OTHER PUBLICATIONS

"WLS—Water Level Sensor for storage tanks," Product Information, Water Level Sensor, Rosemont Tank Radar AB, Second Edition, Sep. 2006, Ref. No. 109526En, 2 pages.

* cited by examiner

SLUG MITIGATION BY INCREASING AVAILABLE SURGE CAPACITY

TECHNICAL FIELD

This disclosure relates generally to process control systems and more specifically to slug mitigation by increasing available surge capacity.

BACKGROUND

Processing facilities, such as manufacturing plants, chemical plants and oil refineries, typically are managed using process control systems. Valves, pumps, motors, heating/cooling devices, and other industrial equipment typically perform actions needed to process materials in the processing facilities. Among other functions, the process control systems often control industrial operation in the processing facilities.

A very common problem encountered in many industries, such as the oil production and petrochemical industry, is compensating for variations in the flow rate of fluids (liquid and/or gases) coming into a particular processing unit. Such disturbances are usually common and ordinary events in the routine operation of the process.

As an example, in oil production processes, production from oil wells includes a mixture of oil, water and gas that flows from the wells to surface vessels, such as separators. The separation of phases can cause an undesirable operating condition when production flow becomes discontinuous with periods of large volume of liquid phase followed by periods of predominately gaseous phase. This phenomenon, referred to as "slugging," causes the liquid flow into the separator to swing significantly. Slugging can lead to unstable operation of the process equipment downstream from the separators, which can shut down the production platform and result in a significant economic loss to the oil producing company.

Microprocessor-based proportional, integral and derivative (PID) controllers are commonly used for level control to reduce variations in the flow supplied to a downstream process. However, PID algorithms run by PID controllers often have two significant limitations. First, PID algorithms are typically unable to address non-linearities. Second, PID algorithms often cannot be used to specify high and low limits for liquid levels explicitly. Moreover, if the inlet flow has a large noise component, such as due to an upstream process that is noisy, control using a PID algorithm becomes increasingly ineffective.

SUMMARY

This disclosure provides a system and method for slug mitigation.

In a first embodiment, an apparatus includes a housing having a volume and an inlet. The inlet is configured to receive a fluid that includes a gas and a liquid. The apparatus also includes a baffle configured to partition the volume into a first portion and a second portion. The baffle extends from a base of the housing. The first portion is configured to receive the liquid and separate the liquid into a first part and a second part. The second portion is configured to receive the second part of the liquid from the first portion. The apparatus further includes a controller configured to regulate an amount of the second part of the liquid in the second portion such that a level of the second part of the liquid is higher than a height that the baffle extends from the base of the housing.

In a second embodiment, a method includes receiving a fluid from an upstream process at a separator. The separator includes a baffle that separates a first portion and a second portion. The method also includes separating the fluid into two or more parts and storing at least a portion of the first part of the fluid in the second portion of the separator. The method further includes maintaining a level of the first part of the fluid stored in the second portion in a range above the baffle.

In a third embodiment, a system includes a central processing unit and a computer readable medium electronically coupled to the central processing unit. The computer readable medium includes a control program that uses a vessel with a baffle that separates the vessel into at least two portions. The control program causes the central processing unit to regulate a level of a first part of a fluid stored in at least one portion of the vessel in a range above the baffle.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system. Also, it will be understood that elements in the figures are illustrated for simplicity and clarity and have not necessarily been drawn to scale. For example, the dimensions of some elements in the figures may be exaggerated relative to other elements to help improve the understanding of various embodiments described in this patent document.

Figure 1:
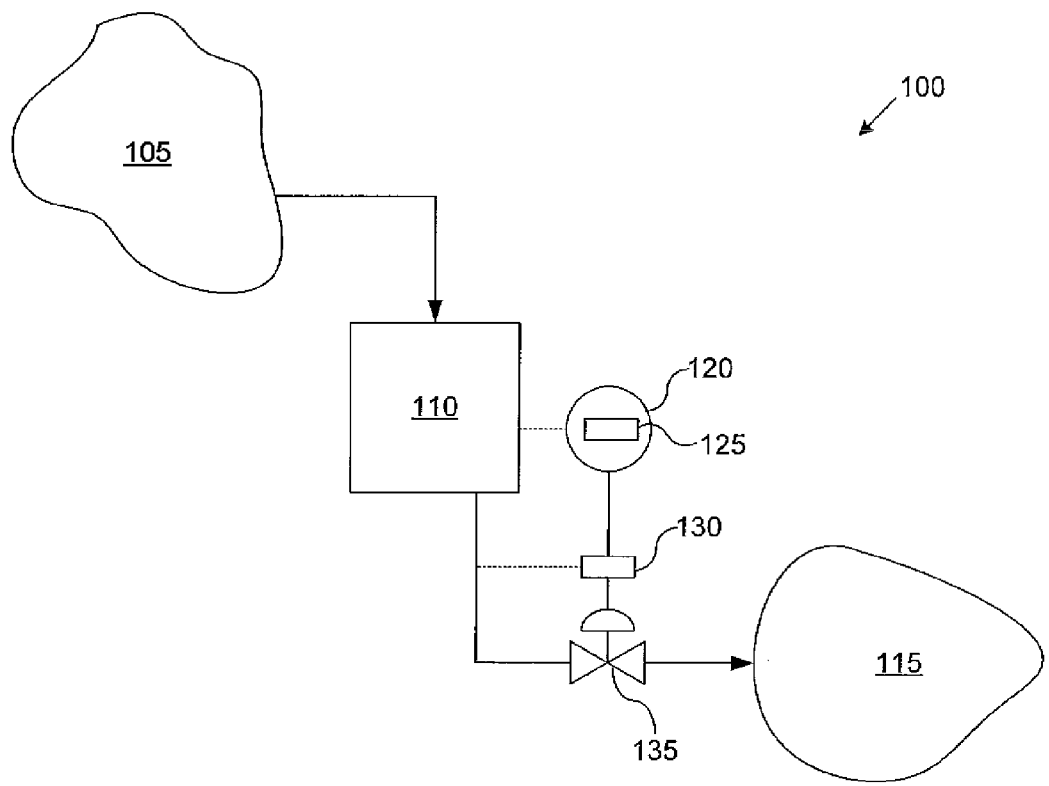
FIG. 1 illustrates an example system for processing a fluid through a separator according to this disclosure.

FIG. 1 illustrates an example system 100 for processing a fluid through a separator according to this disclosure. The embodiment of the system 100 shown in FIG. 1 is for illustration only. Other systems could be used without departing from the scope of this disclosure.

In this example, the system 100 includes one or more upstream processes 105 that provide an outlet flow of at least one fluid. The fluid includes a gaseous portion and a liquid portion. The liquid portion of the fluid may fluctuate significantly and therefore be "noisy." The outlet flow from the upstream process 105 is coupled via one or more vessels 110 to an inlet flow of one or more downstream processes 115. The downstream process 115 can be, for example, a separator vessel having equipment such as valves, pumps and motors. The downstream process 115 can also be a distillation tower or a furnace.

Each vessel 110 may be coupled to a non-linear level controller (NLLC) 120. The NLLC 120 can be a non-linear level controller as described in U.S. patent application Ser. No. 11/859,432, which is hereby incorporated by reference in its entirety. In this example, the NLLC 120 includes a central processing unit (CPU) 125, as well as associated memory. The memory can be any computer readable medium, for example, the memory can be any electronic, magnetic, electromagnetic, optical, electro-optical, electro-mechanical, and/or other physical device that can contain, store, communicate, propagate, or transmit a computer program, software, firmware, or data for use by the microprocessor or other computer-related system or method. The NLLC 120 stores or receives a plurality of inputs, such as a setpoint (SP), a high level (HL), a low level (LL), and tuning constants (T1 and T2), as well as current level (inventory) data from the vessel 110. The NLLC 120 also executes a control algorithm and adjusts system flows, including a flow of the fluid to the downstream process 115 via a flow controller (FC) 130, which adjusts the outlet flow from the vessel 110 together with a control valve 135.

Figure 2:
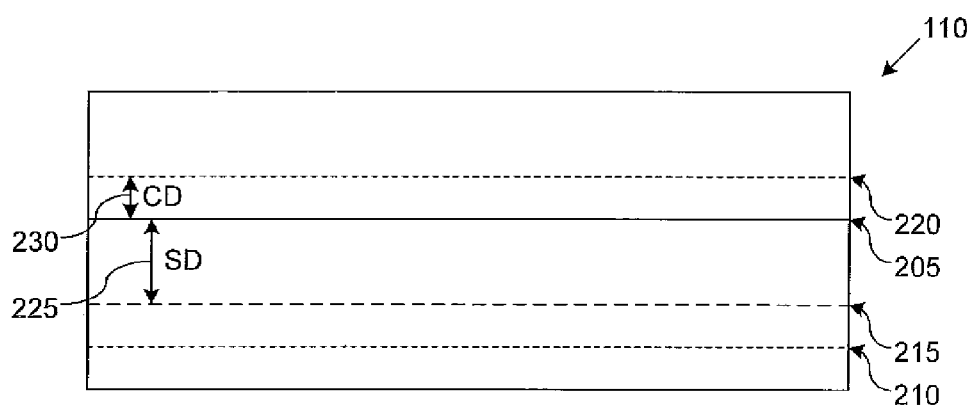
FIG. 2 illustrates an example vessel according to this disclosure.

FIG. 2 illustrates an example vessel 110 according to this disclosure. The embodiment of the vessel 110 shown in FIG. 2 is for illustration only. Other vessels could be used without departing from the scope of this disclosure.

In this example, the vessel 110 includes a liquid shown reaching a current level 205. The vessel 110 is associated with several parameters such as a low level limit 210, a setpoint 215, and a high level limit 220. The desired level is shown as the setpoint 215. The operating capacity of the vessel 110 is specified in terms of the low limit 210 and the high level limit 220, outside of which operation is not desirable. Low limit 210, setpoint 215 and high level limit 220, together with the current level 205, define two differential parameters—a setpoint deviation (SD) 225 and a capacity deviation (CD) 230. To keep the liquid level at the setpoint 215 would mean that the outlet flow follows fluctuations in the inlet flow. As shown in FIG. 2, the current level 205 is above the setpoint 215. However, the current level 205 can also be at or below the setpoint 215.

The CD 230 is a measure of discrepancy in the current level 205 and a prevailing limit, which is generally either the low limit 210 or the high limit 220. Although FIG. 2 shows the prevailing limit as being the high limit 220, the prevailing limit can also be the low limit 210 such that the CD 230 is a measure of the discrepancy between the actual inventory (the current level 205) and the low limit 210. The prevailing limit can be detected by the NLLC 120 based on, for instance, the sign of the time derivative of the liquid level in the vessel 110. For example, if the level in the vessel 110 is increasing, the sign of the derivative is positive, and the prevailing limit can be the high limit 120. Conversely, if the level is decreasing, the sign of the derivative is negative, and the prevailing limit can be the low limit 210. The CD 230 is thus measured in terms of the volume (available or excess) from the current level 205 to generally reach the prevailing limit.

The SD 225 is a measure of discrepancy of the current level 205 from the setpoint 215. The SD 225 can be measured in terms of the volume (available or excess) from the current level 205 to generally reach the setpoint 215.

A first time (T1) to reduce the CD 230 by a first specified percentage (such as 100%/exhaust) and a second time (T2) to reduce the SD 225 by a second specified percentage (such as 100%/exhaust) are generally provided. For example, values for T1 and T2 can be derived from conventional empirical process tuning tests. In addition, the tuning constants (T1 and T2) can be derived from observations of plant operating data, vessel dimensions, the nature and magnitude of disturbances experienced based on actual plant operating data, and control objectives defined by engineers or other plant personnel. T2 may generally be greater than T1. It may also be possible to determine T1 and T2 through modeling. In some embodiments, the specified percentages can both be 100%, T1=15 minutes, and T2=60 minutes.

Figure 3:
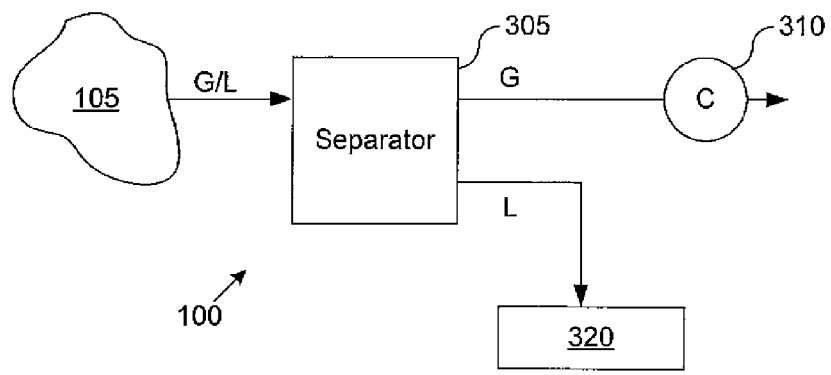
FIG. 3 illustrates an example system configuration for processing a fluid through a separator according to this disclosure.
Figure 4A:
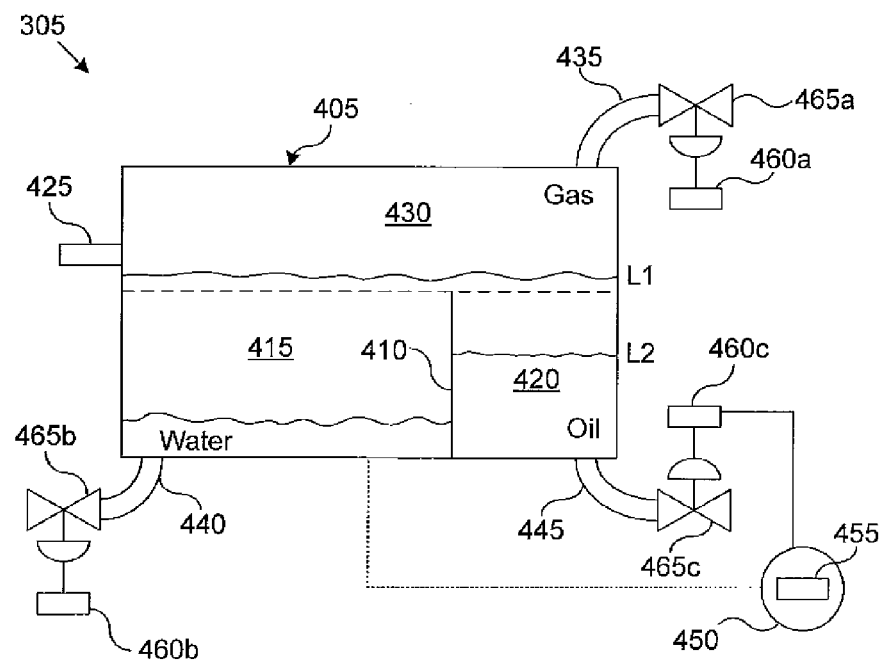
FIGS. 4A through 4D illustrate an example separator according to this disclosure.
Figure 4B:
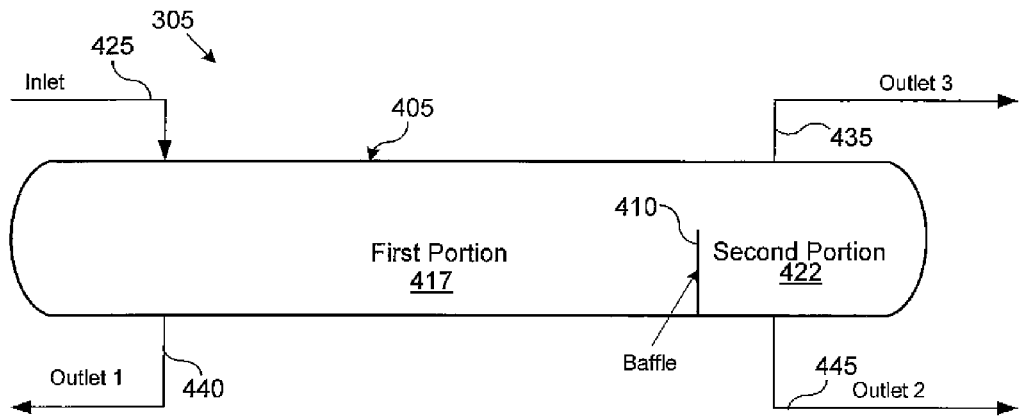
Figure 4C:
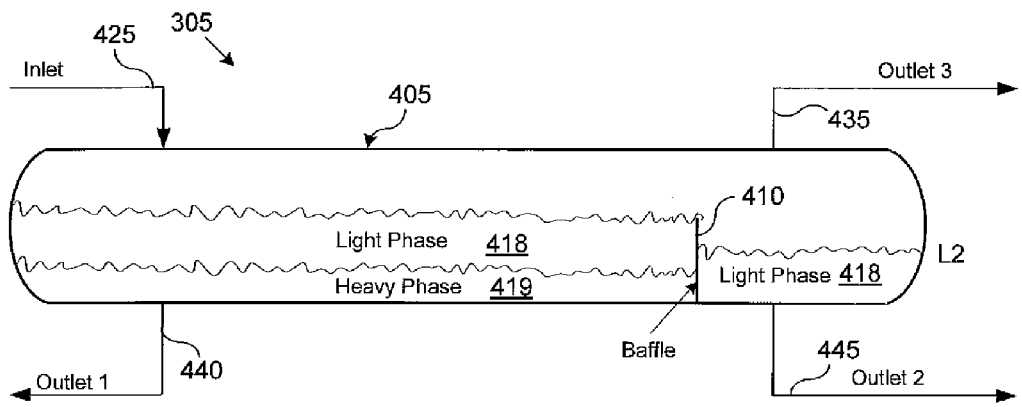
Figure 4D:
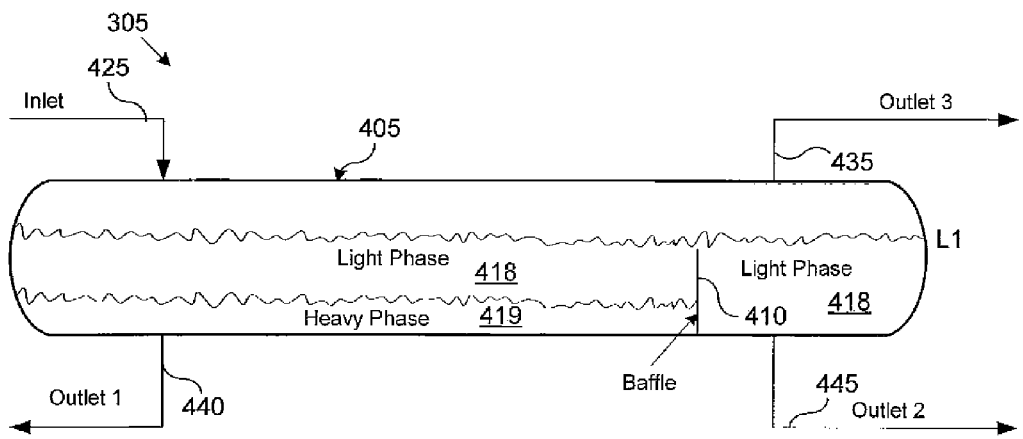

FIG. 3 illustrates an example system configuration for processing a fluid through a separator according to this disclosure. The embodiment of the system 100 shown in FIG. 3 is for illustration only. Other systems configurations could be used without departing from the scope of this disclosure.

In this example, the system 100 includes a separator 305 coupled to a compressor 310 and other downstream equipment 320. The separator 305 receives, via an inlet, fluid from one or more upstream processes. The fluid can include a gaseous (G) portion and a liquid (L) portion. The separator 305 separates the fluid into a gaseous portion and a liquid portion. The gaseous portion can be delivered to the compressor (C) 310 coupled to a first outlet to the separator 305. The liquid portion can be delivered via a second outlet of the separator 305 to additional process equipment 320 in the downstream process 115.

In some embodiments, the separator 305 can receive fluid produced as part of an oil production process from a number of oil wells in the upstream process 105. The fluid produced from the oil production process includes a mixture of oil, water, and gas. The separator 305 separates the oil and water in the liquid phase from the gas and provides the gas to the compressor 305. The oil and water are drawn out of the separator 305 and delivered to the downstream equipment 320.

The compressor 310 can be damaged if liquid-phase material is processed through the compressor 310. Therefore, the separator 305 separates the liquid from the gas and provides the gas to the compressor 310 as the gas is separated from the liquid. However, conventional separators 305 cannot compensate for slugging where, for example, no gas or no liquid is received by the separator 305. When no gas is received by the separator 305, the separator 305 may deliver liquid, such as oil, water or both, to the compressor 310. As a particular example, this can occur if all of the gas is drained from the separator 305. This can damage the compressor 310.

In addition, the separator 305 may be unable to deliver liquid to the downstream equipment 320 if only gas is received for a period of time. For example, the separator 305 may receive only gas for thirty seconds. During that period, the liquids may be fully drained from the separator 305. Therefore, the separator 305 does not deliver either water or oil to the downstream equipment 320, which may cause damage to one or more pieces of the downstream equipment 320.

FIGS. 4A through 4D illustrate an example separator 305 according to this disclosure. The embodiments of the separator 305 shown in FIGS. 4A through 4D are for illustration only. Other separators could be used without departing from the scope of this disclosure.

In this example, the separator 305 includes a vessel volume contained by a housing 405. In some embodiments, the separator 305 includes a cylinder housing that is placed horizontally or vertically. The separator's vessel volume is partitioned into two parts by a baffle 410 positioned vertically and attached to a lower half of the housing 405. An oil and water portion 415 forms on a first side 417 of the baffle 410, and an oil-only portion 420 forms on a second side 422 of the baffle 410. The oil and water portion 415 can be significantly larger than the oil-only portion 420. For example, the size of the oil and water portion 415 can be ten times larger than the oil-only portion 420. The larger oil and water portion 415 includes enough volume to enable the oil to separate from the water.

Production from the wells flows into the oil and water portion 415 via an inlet 425. In the oil and water portion 415, separation between gas and oil and water occurs. Gas flows into an overhead portion 430. The oil and water settle into the oil and water portion 415, where the oil and water separate such that the oil rises to the top and the water settles to the bottom of the oil and gas portion 415. Since (i) the oil has a low density compared to water and (ii) the oil includes non-polar organic compounds (while water is a polar compound), the oil does not substantially mix with water and floats on the water's surface. Therefore, an immiscible liquid mixture of oil and water is received from the production of wells.

The gas is drawn out of the separator 305 via a first outlet 435, while water is drawn out of the separator 305 via a second outlet 440. The water is drawn out of the separator 305 at a rate such that the water level in the oil and water portion 415 remains below the height of the baffle 410. As the water and oil separate in the oil and water portion 415, the oil settles on top of the water. Therefore, the immiscible liquid mixture of oil and water separate into a light phase 418 and a heavy phase 419. The heavy phase 419 settles to the bottom of the vessel volume, and the light phase 418 settles on top of the heavy phase 419. The water is drawn out at a rate that enables at least a portion of the oil on the surface of the water to flow over the top of the baffle 410 into the oil-only portion 420. The oil is drawn out of the separator via a third outlet 445.

The separator 305 includes or is otherwise associated with an NLLC 450. The NLLC 450 can include similar structure and functionality as the NLLC 120 and, as such, can include a central processing unit (CPU) 455 and associated memory. The NLLC 450 stores or receives inputs such as setpoint, high level, low level, tuning constants, and current level (inventory) data for oil in portions 415 and 420 of the separator 305. The NLLC 450 executes a control algorithm and adjusts flow out of the outlet 445 to the downstream equipment via flow controller 460c and control valve 465c. Other control valves 465a-465b and respective flow controllers 460a-460b adjust the outlet flows from the separator 305 under control of one or more additional controllers (not shown).

In conventional separator systems, oil is drawn at a rate such that the oil level is maintained at a fixed level, such as level L2, below the baffle height. The conventional separator systems are unable to maintain the oil level above the baffle's height because a mathematical discontinuity occurs when the oil level exceeds the baffle height.

In accordance with this disclosure, the NLLC 450 executes an optimal surge control process to control the oil level in the separator 305 such that the oil level can be controlled in a range above the baffle 410. The NLLC 450 also addresses any non-linear behavior in the operation of horizontal and vertical separators. In particular, the NLLC 450 can maintain the oil at level L1 (shown in FIG. 4D) instead of L2 (shown in FIG. 4C). The NLLC 450 can maintain the oil at level L1 by using a lower limit that is established above or below the baffle height. In addition, the NLLC 450 can use an established upper limit and setpoint. In some embodiments, the lower limit is at or above level L1.

Maintaining the oil level above the baffle 410 can increase or maximize the use of the available surge capacity in the separator 305 and thus provide an opportunity to stabilize the oil flow from the separator 305. The available surge capacity can equal the volume of the oil-only portion 420 between the baffle's height and level L2 plus the volume of the entire separator vessel between the level L1 and the baffle's height. For example, when the separator 305 receives only gas for a period of time, such as for thirty seconds, the oil can continue to be drawn out of the separator at the same rate to "ride-out" the gas-only flow because of the increased surge capacity of the oil created by maintaining the oil at level L1 instead of L2.

In some embodiments, the NLLC 450 calculates an unforced time (referred to as T*) to reduce the CD by the first specified percentage. For example, if the first specified percentage is 100%, T* is thus defined as the time to completely exhaust the CD corresponding to a volume of the fluid comprising liquid if no changes to the flows are made by the controller (e.g., the status quo). Thus, the conditions for calculating the unforced time can be based on the most recent measurement of the current level 205 that is stored in the memory associated with the NLLC 450 and/or the change in the current level 205 since the last execution of the NLLC process.

Figure 5:
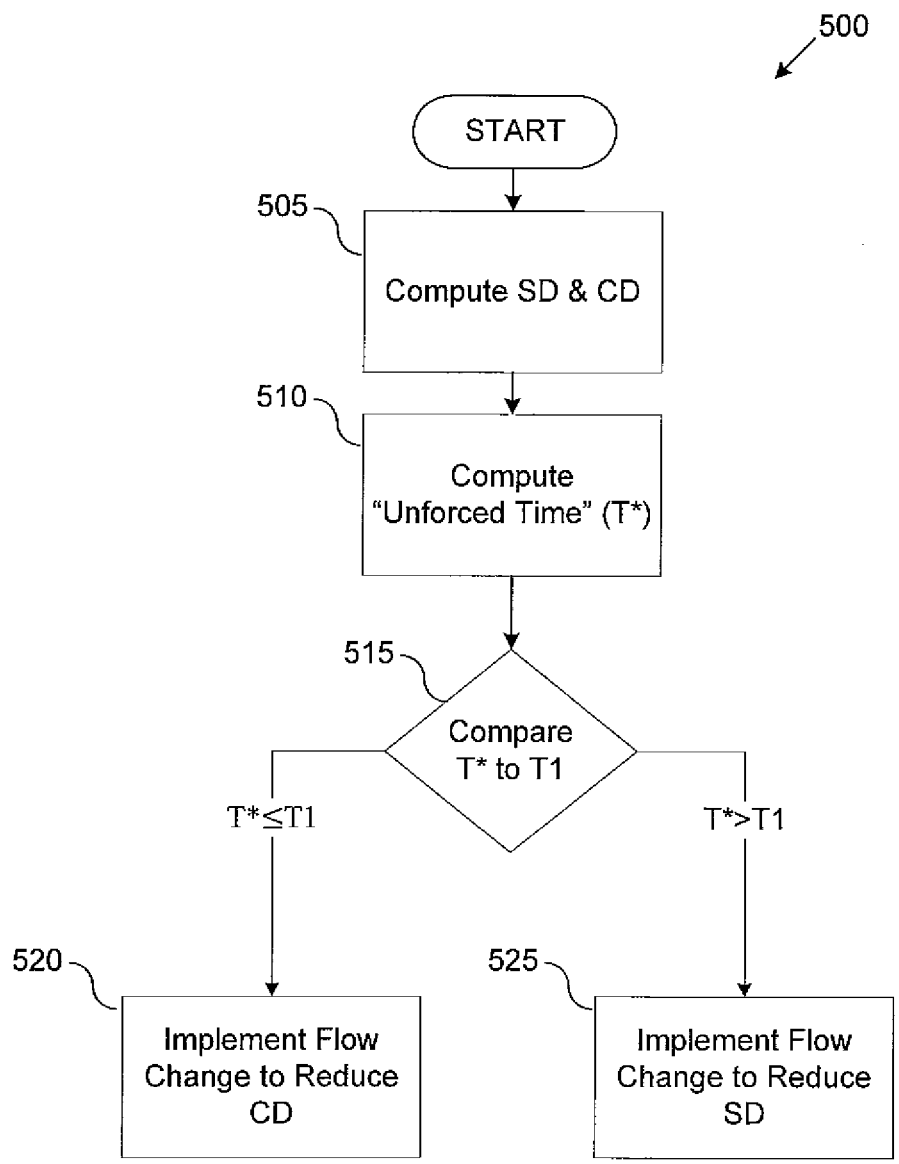
FIG. 5 illustrates an example process for controlling surge capacity of a separator vessel according to this disclosure.

FIG. 5 illustrates an example process 500 for controlling surge capacity of a separator vessel according to this disclosure. In this particular example, the process 500 is configured to exhaust the majority of CD in T1 minutes and/or exhaust the majority of SD in T2 minutes. Non-linear control is based on the differential parameters CD and SD and the relative speed of the flow disturbance, which controls surge capacity for the separator 305.

In block 505, SD and CD as described above are calculated. In block 510, T* can be calculated or otherwise provided, such as stored from an earlier computation. In block 515, T* is then compared to a time constant T1.

If $T^* \leq T1$, the variation/disturbance in inlet flow is relatively fast. The NLLC 450 computes a first minimum change in the outlet flow (for outlet 445 from the separator 305) to reduce CD by the first specified percentage in a time T1. The minimum change is calculated and implemented as a flow change in block 520.

If $T^* > T1$, the variation/disturbance in inlet flow is relatively slow. The NLLC 450 computes a second minimum change in the outlet flow (for outlet 445 from the separator 305) to reduce or exhaust SD by the second specified percentage in a time T2. The minimum change is calculated and implemented as a flow change in block 525.

Accordingly, the NLLC 450 is configured to perform an optimal surge control process to maintain the oil at a level sufficient to provide a surge capacity. The NLLC 450 can determine the current "inventory" level of the oil and access a previous level stored in memory. If the current level is outside a limit and worsening, the NLLC 450 computes a change to the flow rate through the outlet 445 to keep the oil level from getting worse. If the unforced time to exhaust CD (T*) is less than a specified time (T1), the NLLC 450 computes a capacity change. If the unforced time to exhaust CD (T*) is greater than the specified time (T1), the NLLC 450 computes a setpoint change. The flow change can be implemented using a flow control parameter. The NLLC 450 can control the output flow setpoint of the flow controller 460c that is coupled to the control valve 465c to implement the first minimum flow change (when $T^* \leq T1$) or the second minimum flow change (when $T^* > T1$).

Although the figures above illustrate specific systems, structures, and processes, various changes may be made to the figures. For example, various components in the systems and structures can be combined, omitted, further subdivided, or moved according to particular needs. Also, while shown as a series of steps, various steps in FIG. 5 could overlap, occur in parallel, or occur multiple times.

It may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
a housing having a volume and an inlet, the inlet configured to receive a fluid comprising a liquid;
a baffle configured to partition the volume into a first portion and a second portion, the baffle extending from a base of the housing, the first portion configured to receive the liquid and separate the liquid into a first part and a second part, the second portion configured to receive the second part of the liquid from the first portion; and
a controller configured to regulate an amount of the first part of the liquid in the first portion such that a level of the first part of the liquid is lower than a height that the baffle extends from the base of the housing, the controller also configured to regulate an amount of the second part of the liquid in the second portion such that a level of the second part of the liquid is maintained higher than the height that the baffle extends from the base of the housing.

2. The apparatus of claim 1, wherein the controller comprises a non-linear level controller.

3. The apparatus of claim 2, wherein the non-linear level controller is configured to maintain the level of the second part of the liquid by controlling an outlet flow rate of the second part of the liquid through an outlet of the housing.

4. The apparatus of claim 2, wherein the non-linear level controller is configured to calculate an unforced time required for a discrepancy between an actual level of the second part of the liquid and a limiting level of the second part of the liquid to exhaust.

5. The apparatus of claim 4, wherein the non-linear level controller is configured to calculate a change in an outlet flow rate of the second part of the liquid to at least one of:
reduce a discrepancy between the actual level of the second part of the liquid and a desired level of the second part of the liquid; and
reduce the discrepancy between the actual level of the second part of the liquid and the limiting level of the second part of the liquid.

6. The apparatus of claim 1, further comprising:
a first outlet configured to draw the first part of the liquid from the first portion; and
a second outlet configured to draw gas from the housing.

7. The apparatus of claim 1, wherein the first part comprises a heavier phase of the liquid and the second part comprises a lighter phase of the liquid.

8. A method comprising:
receiving a fluid from an upstream process at a separator, the separator comprising a volume and a baffle separating a first portion of the volume and a second portion of the volume;
separating the fluid into two or more parts including a first part and a second part;
storing at least a portion of the second part of the fluid in the second portion; and
maintaining a level of the first part of the fluid stored in the first portion in a range below the baffle and maintaining a level of the second part of the fluid stored in the second portion in a range above the baffle.

9. The method of claim 8, wherein maintaining the level of the second part of the fluid comprises:
controlling an outlet flow rate of the second part of the fluid through an outlet of the separator.

10. The method of claim 9, further comprising:
calculating an unforced time required for a discrepancy between an actual level of the second part of the fluid and a limiting level of the second part of the fluid to exhaust.

11. The method of claim 9, wherein controlling the outlet flow rate of the second part of the fluid comprises calculating a change in the outlet flow rate to reduce a discrepancy between an actual level of the second part of the fluid and a desired level of the second part of the fluid.

12. The method of claim 9, wherein controlling the outlet flow rate of the second part of the fluid comprises calculating a change in the outlet flow rate to reduce a discrepancy between an actual level of the second part of the fluid and a limiting level of the second part of the fluid.

13. The method of claim 9, wherein separating comprises separating the fluid into a lighter phase of the fluid and a heavier phase of the fluid.

14. A system comprising:
a central processing unit; and
a computer readable medium electronically coupled to the central processing unit, the computer readable medium comprising a control program that is configured to control a system having a vessel with a baffle, wherein the baffle is configured to separate the vessel into at least two portions and the control program is configured to cause the central processing unit to regulate a level of a first part of a fluid stored in a first portion of the vessel in a range below the baffle and to regulate a level of a second part of the fluid stored in a second portion of the vessel such that the level of the second part of the fluid in the second portion is maintained in a range above the baffle.

15. The system of claim 14, wherein the control program comprises an optimal surge control process configured to maintain the first part of the fluid at a level sufficient to provide a surge capacity.

16. The system of claim 14, wherein the control program is configured to cause the central processing unit to regulate the level of the second part of the fluid by controlling an outlet flow rate of the second part of the fluid through an outlet of the housing.

17. The system of claim 14, wherein the control program is configured to cause the central processing unit to calculate an unforced time required for a discrepancy between an actual level of the second part of the fluid and a limiting level of the second part of the fluid to exhaust.

18. The system of claim 14, wherein the control program is configured to cause the central processing unit to calculate a change in an outlet flow rate of the second part of the fluid to reduce a discrepancy between an actual level of the second part of the fluid and a desired level of the second part of the fluid.

19. The system of claim 14, wherein the control program is configured to cause the central processing unit to calculate a change in an outlet flow rate of the second part of the fluid to reduce the discrepancy between an actual level of the second part of the fluid and a limiting level of the second part of the fluid.

20. The system of claim 14, wherein the second part comprises a lighter phase of the fluid and the first part comprises a heavier phase of the fluid.

* * * * *